Figure 1:
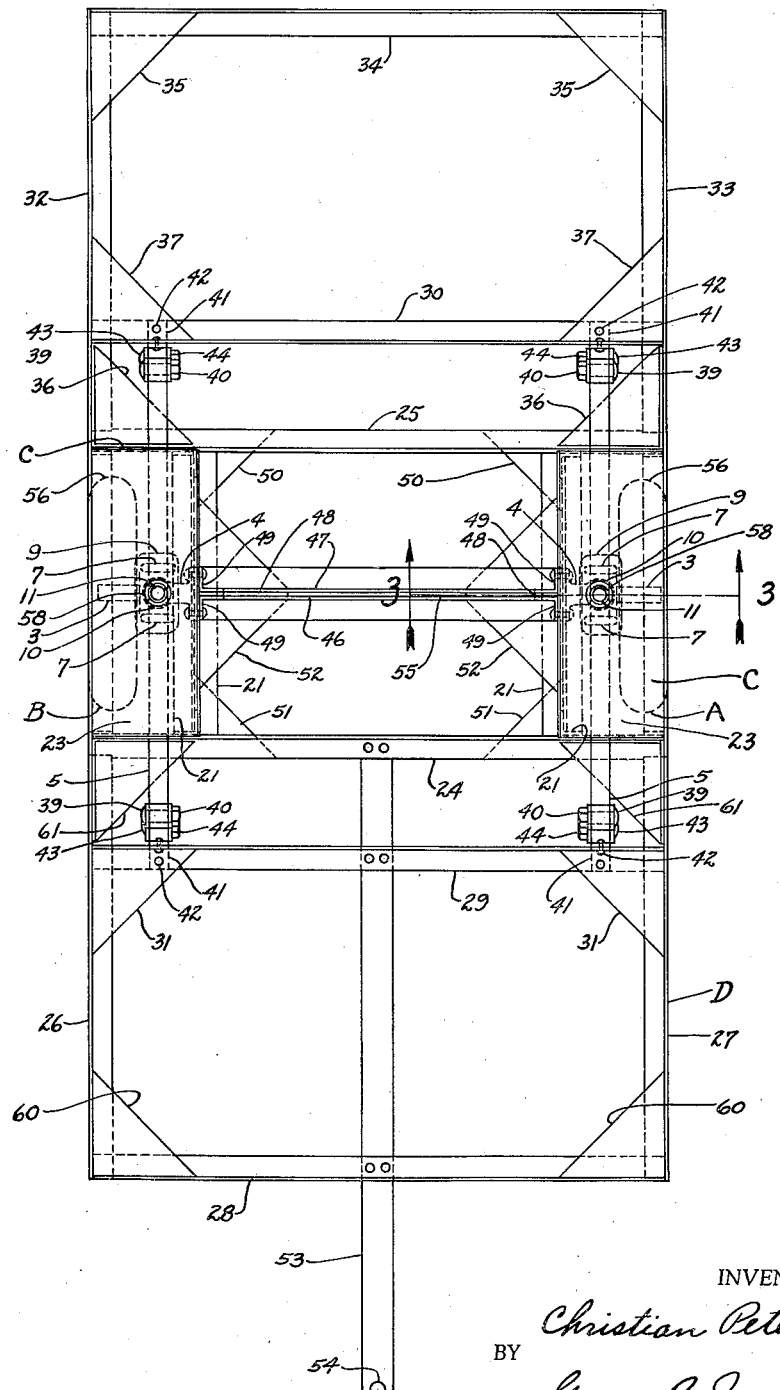

July 24, 1934.  C. PETERSEN  1,967,425

TRAILER VEHICLE

Filed June 29, 1933  2 Sheets-Sheet 1

INVENTOR.
Christian Petersen,
BY George B. Ingersoll
ATTORNEY.

July 24, 1934.  C. PETERSEN  1,967,425
TRAILER VEHICLE
Filed June 29, 1933   2 Sheets-Sheet 2
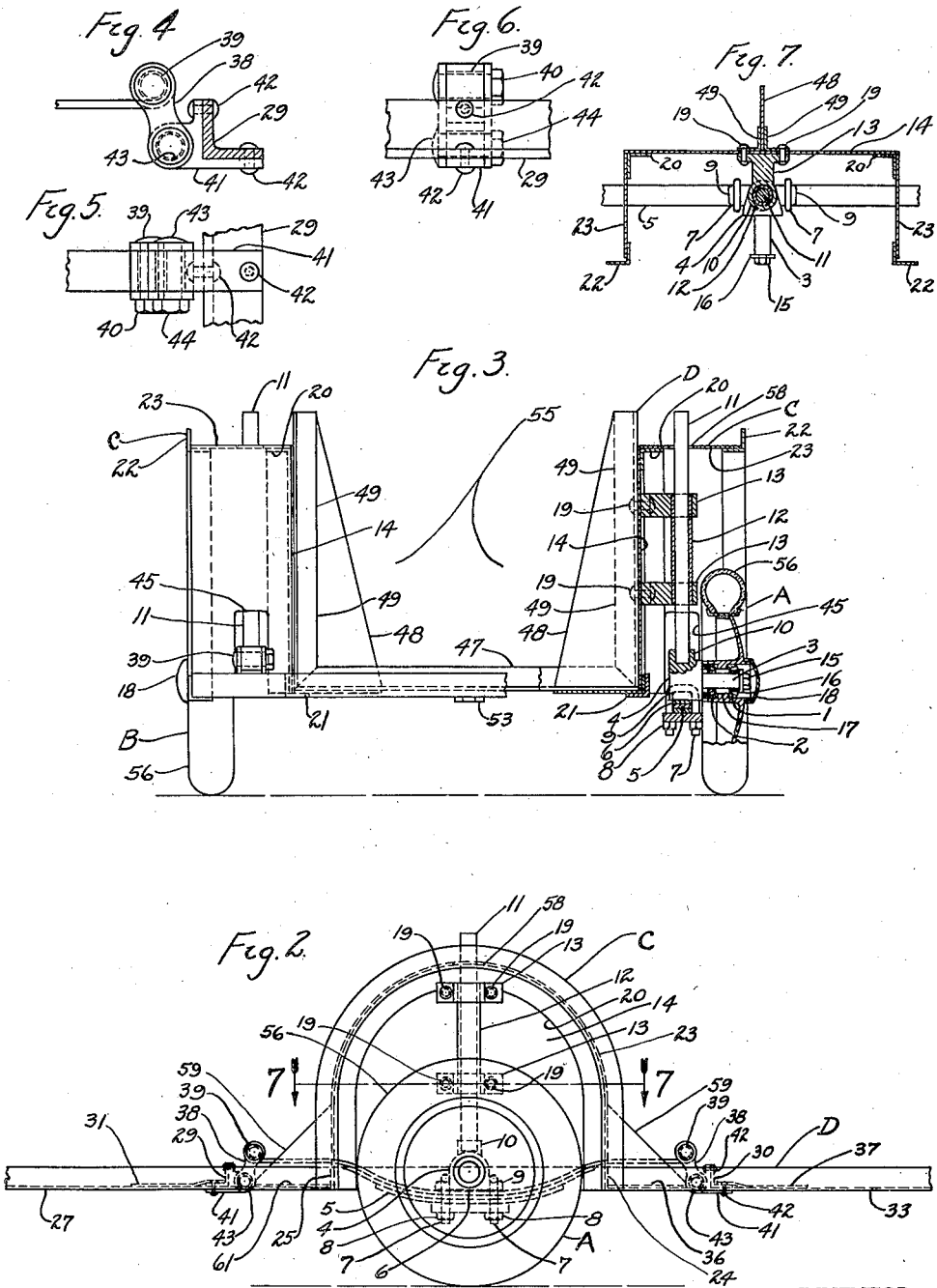

Patented July 24, 1934

1,967,425

UNITED STATES PATENT OFFICE 1,967,425

TRAILER VEHICLE

Christian Petersen, Dearborn, Mich.

Application June 29, 1933, Serial No. 678,157

20 Claims. (Cl. 280—106.5)

My invention relates to improvements in vehicles used in trailer operation, and the objects of my improvement are, first, to provide a trailer vehicle having no axle beam connecting its wheel mechanism; second, to provide a trailer vehicle utilizing a frame construction for connecting the wheel mechanisms; third, to provide a trailer vehicle having wheel housings connected by a frame structure providing a passage way of varying widths therebetween; fourth, to provide a trailer vehicle in which the trailer pull or load for moving the vehicle is transmitted through the frame mechanism directly to the spindle mechanism of a wheel assembly; fifth, to provide a vehicle in which a housing for a wheel assembly is utilized as a part of the connecting mechanism between the spindles of the wheel assembly; sixth, to provide a vehicle having a wheel housing structure through which extends a resilient member for supporting the vehicle on wheel assemblies; seventh, to provide a wheel and spring structure with means connected with the wheel assemblies for guiding the spring structure in its oscillating movement; eighth, to provide a vehicle with a spring structure extending above portions of a frame structure to which the resilient structure is pivotally connected; ninth, to provide a vehicle having a very low center of gravity due to the frame structure being supported in close proximity to the ground; tenth, to provide a vehicle having a frame structure having a narrower load carrying space between its wheel assemblies than at its forward or rearward portions adjacent the wheel assemblies; eleventh, to provide a vehicle having a frame assembly extending outwardly in a transverse direction from resilient members upon which the frame is mounted; twelfth, to provide a vehicle adapted for supporting a camping body vehicle having a wheel connecting structure adapted to provide a narrowed entrance between the room portions of the camping body; thirteenth, to provide a vehicle having a wheel connecting structure formed by a plurality of angle members of different lengths; and fourteenth, to provide a vehicle with means for controlling the direction of movement of a vehicle wheel and spring structure in a vertical plane extending through the axis of the wheel.

I attain these objects by mechanisms illustrated in the accompanying drawings, in which:—

Figure 1 is a plan view of the trailer vehicle; Fig. 2, a side view of a portion of the trailer vehicle; Fig. 3, a partial front view, together with a partial sectional view of a vehicle taken on the line 3—3, Fig. 1; Fig. 4, a side view of a portion of the spring and its shackle mechanism; Fig. 5, a bottom view of the spring and shackle mechanism disclosed in Fig. 4; Fig. 6, an end view of the spring and shackle mechanism disclosed in Fig. 4; and Fig. 7, a sectional view taken on the line 7—7, Fig. 2.

Similar numerals refer to similar parts throughout the several views.

The wheel assemblies A and B are revolvably mounted on the bearing assemblies 1 and 2 which are suitably secured on the spindle portions 3 of the spring seats 4 to which is secured, at its lower side, the resilient or spring members 5, said spring members 5 being secured to the spring seat surface 6 by the clips 7 and the nuts 8, the spring clips 7 having U shaped portions at their upper side which fit over and are retained within a depressed portion, having a similar shape, at the upper sides of the flanges 9, the underside of which are provided with the spring seat surfaces 6. The spring seats or brackets 4 are provided with portions 10 at their upper sides in which are suitably secured the shafts 11 which extend vertically upward and are slidably mounted in the tubular guide members 12, which are suitably secured in the brackets 13 which are in turn suitably secured to the members 14, which form the inside walls of the wheel housing structures C.

The bearing assemblies 1 and 2 are suitably secured on the spindle portion 3 of the spring seats 4 by the nuts 15, the washers 16, and the spacers 17, the wheel assemblies A and B being closed at their central portions by the hub caps 18 which further enclose the bearing assemblies 1 and 2. The brackets 13 may be suitably secured to the members 14 by rivets 19 or by similar securing means.

The above mentioned members 14 which form the inner wall of the wheel housing assemblies C are suitably secured to the angle members 20 which are suitably connected at their lower portions to the angle members 21 which extend in a fore and aft direction, across the lower ends of the members 14, the members 14 being formed in a similar circular shape, at their upper ends, to conform to the necessary shape and size of the wheel housing assemblies C.

The angle members 22 are located at the outer side of the wheel housing assemblies C and are located with their outer flanges extending upwardly in an opposite direction from the inner flange of the angle members 21, the inner flanges of the angle members 21 extending downwardly around and within the housing assembly C. The angle members 20 and 22 may be connected by the wall member 23 which is formed with a semicircular shape at its upper portion and is suitably secured to the inwardly and outwardly extending flange portions of the angle members 20 and 22, the members 23 thus forming the upper and side walls of the wheel housing assemblies C.

The angle members 24 and 25 are so located as to extend transversely relative to the vehicle at points adjacent the lower ends of the angle members 20 and 22, the angle members 24 and 25 being suitably connected to the angle members 20 and 22, the angle members 24 and 25 being further suitably connected to the forwardly extending angles 26 and 27 which form the sides of the frame assembly D at its forward end, the angle members 26 and 27 being connected to the angle member 24 by the gussets 61.

The angle members 26 and 27 can be extended to any desired length to suit the front portion and shape of the body structure which is to be mounted on the frame assembly D, the forward ends of the angle members 26 and 27 being connected to the angle member 28 by the gusset members 60.

The angle member 29 may be located in a forward position relative to the wheel housings C and the angle member 30 may be located in a rearward position relative to the wheel housings C, to form the support members for the ends of the spring members 5. The angle member 29 will be suitably connected directly to the angle members 26 and 27 and also will be further connected to them by the gusset members 31.

The angle member 30, located at the rear of the wheel housings C, will be suitably connected directly to the angle members 32 and 33, the angle members 32 and 33 forming the sides of the frame assembly D at the rear of the wheel housing assemblies C. The angle members 32 and 33 may be extended for any desired or reasonable distance behind the wheel housings C and may be connected at their extreme rear ends by the angle member 34 which is suitably and directly connected to the angle members 32 and 33, and is also further connected by the gusset members 35.

The angle members 32 and 33 are connected directly to the angle member 25 and is also further connected to it by the gussets 36. The angle members 32 and 33 are connected directly to the angle member 30 and is also further connected thereto by the gussets 37.

The ends of the spring members 5 are pivotally connected to the shackles 38 by the pins 39, the pins 39 being suitably retained therein by the nuts 40. The shackles 38 are pivotally connected to the brackets 41 which may be secured to the angle members 29 and 30 by the rivets 42 or by similar securing means. The pins 43 are pivotally mounted in the brackets 41, the pins being secured by the nuts 44.

It is to be noted that the springs 5 extend through the openings 45 in the forward and rear sides of the members 23, the openings 45 being of sufficient height to permit the frame assembly D with its attached and supported parts to move up and down, the movement of the frame assembly D and its connected parts being in a vertical direction due to the member 11 being guided to move only in a vertical direction, the member 11 extending through suitable openings 58 in the upper portions of the members 23.

It is to be noted that the members 24 and 25 will be located below the springs 5 and below the openings 45. The shackles 38 will permit the springs 5 to lengthen or shorten in their operative positions inasmuch as the frame assembly D is resiliently and movably supported on the springs 5.

It is to be noted that the springs 5 will be retained securely at their central portions from any movement except in a vertical direction as guided by the member 11 in the tubular member 12. Each of the ends of each of the springs 5 are adapted to operate as a cantilever member to resiliently support its portion of the frame assembly D and its loads. In order to further secure the support of and tie together the wheel housings C, the angle members 46 and 47 extend between the members 14, which form the inside walls of the wheel housing assemblies C, the members 46 and 47 being placed with their vertical flanges adjacent one another, the vertical flanges being spaced sufficiently to receive therebetween the gussets 48 which extend from the bottom of the angle members 46 and 47 to points slightly above the wheel housing assemblies C.

The gussets 48 may be tapered at their inner sides to provide for the maximum amount of metal at the points of maximum stresses and to provide for a greater opening therebetween, at their upper portions. The angle members 46 and 47 will be suitably connected to and formed integrally with the vertical members 49 which are suitably secured to the gussets 48 and to the angle members 46 and 47. The gusset members 50 may be suitably secured to the angle members 21 and the angle members 25, the gusset 51 being further suitably secured to the angles 24, and 21. The gusset 52 may be constructed if desired in one piece and may be suitably secured to the bottom flanges of the angle members 46 and 47 and to the angle members 21.

The tongue 53 may be suitably secured to the angle members 28, 29 and 24 at the forward side or end of the vehicle assembly to provide for suitably connecting with the vehicle to which the trailer vehicle is attached, the tongue 53 being provided with a suitable opening 54 to facilitate attachment to the vehicle to which it is to be connected.

The gussets 59 may be suitably connected to the angle members 22 and to the side members 26, 27, 32 and 33 to further strengthen the frame assembly.

It is to be noted that the space between the gussets 48 which forms a part of the connecting structure between the wheel housings C will form a passageway 55 which may be utilized for the space necessary for passage between rooms located at the forward and rear sides of wheel housing assemblies C when my trailer vehicle is used for supporting camping bodies or similar body structures thereon.

It is to be noted that the guides 11 together with the brackets or spring seats 4 may be constructed of high tensile material which will permit very light weight and sufficient strength for supporting and guiding the movement of the wheels, thus making for a very economical and light weight assembly.

It is to be noted that the wheel assemblies A and B are provided with tires 56, the wheel assemblies A and B being located very close to the portions of the spring seats 4 used for supporting the springs 5 and the guide members 11, thus conserving the necessary operating space for the wheel assemblies A and B and their spring and guiding mechanisms.

It is to be noted that my trailer vehicle is not provided with the usual and conventional axle beam member for connecting the spindle portions which are conventionally used to support wheel assemblies.

It is also to be noted that whereas my invention is disclosed as being applied and used in the construction of a trailer vehicle, I do not wish to limit the scope of my invention to such a vehicle as my construction and design may be effectively utilized in other forms of vehicles including those which are equipped with prime movers and other types of self propelled vehicles.

The use of a conventional axle beam member for connecting the wheel portion of a vehicle such as disclosed, would necessitate raising the frame assembly D vertically to provide necessary and practical ground clearance space and this would in turn develop a higher center of gravity for the body structures that may be supported on the frame assembly D, thus rendering the vehicle harder to control, more unsafe in its travel and with a consequent heavier and costlier construction. Therefore to eliminate the usual type of axle construction for connecting wheel assemblies I use the structure of the frame assembly D together with the structure of the wheel housings C to form the connecting structure between the spring seats 4 which incorporate the spindle portions 3 for supporting the wheel assemblies A and B, thus providing for a much lower center of gravity for the body structure that may be installed on my vehicle, as well as providing for an operating position of the frame assembly which is located in a position adjacent the ground usually occupied by the conventional axle assembly as above mentioned. Therefore I have developed a vehicle with a lower center of gravity and with the necessary and usual operating clearances relative to the ground, upon which the vehicle travels.

I claim:

1. In a trailer vehicle, the combination of a pair of wheel assemblies, a pair of spindle members each supporting one of said wheel assemblies, each of said spindle members being independently mounted relative to one another, springs suitably secured at the under side of said spindle members, a frame assembly extending under the ends of each of said springs, said frame assembly being provided with housings extending over said wheel assemblies, the housings of said frame assemblies being provided with openings to permit said springs to extend and operate therethrough, shackles pivotally connected to each end of said springs and to said frame assembly, a pair of bracket members suitably mounted in each of the housings of said frame assembly, said brackets being located in vertical alignment, tubular members suitably secured in each pair of said bracket members, and guide members suitably connected with said spindle members, said guide members being slidably mounted in said tubular members, said guide members controlling said spindle members and said springs to move in a direction in a vertical plane, said guide members, said tubular members, said brackets, together with said frame assembly constituting the sole means of connecting said spindle members.

2. In a trailer vehicle, the combination of a wheel assembly, a spindle member supporting said wheel assembly, a spring suitably secured to the underside of said spindle member, a frame structure, shackles pivotally connected with said spring and to said frame structure, the upper ends of said shackles extending above said frame structure, and means for controlling the movement of said wheel assembly, said spindle member, and said spring relative to said frame structure, said means being operatively connected with said spindle member and said frame structure, said means comprising a shaft member rigidly connected to said spindle member and extending through a pair of spaced brackets supported on said frame structure in alignment with each other and with the axis of said wheel assembly.

3. In a vehicle, the combination of a spindle member provided with a cylindrical member extending at right angles therewith, a wheel assembly rotatively mounted on said spindle member, a frame structure provided with a pair of aligned brackets engaging the cylindrical member of said spindle member, and a spring member suitably secured to said spindle member at a point below the axis of the wheel assembly, said spring member being oppositely disposed to the cylindrical member of said spindle member, and a frame structure pivotally connected to the ends of said spring, said frame structure having portions extending under said spring.

4. In a vehicle, the combination of a pair of wheel housings, angle members suitably connected with and extending adjacent the forward and rearward sides of said wheel housings, angle members suitably connected with and extending between the inner side walls of said wheel housings, said last mentioned angle members being located at the approximate vertical center of said wheel housings, and wheels operatively mounted in said wheel housings.

5. In a vehicle, a frame structure comprising a pair of wheel housings connected by a pair of frame members together with gusset members located between said pair of frame members, said frame members and said gusset members being located on the approximate vertical center of the wheel housings.

6. In a vehicle, a frame structure comprising a pair of wheel housings suitably connected by frame members extending therebetween, said frame structure further comprising vertically extending gusset members provided with edges tapered downwardly from the inner sides of said wheel housings.

7. In a vehicle, a frame structure comprising a pair of angle members extending transversely of the frame structure, a pair of members extending at right angles to and suitably connected to said first mentioned pair of members at points between their ends, said frame structure further comprising wheel housings suitably connected with and extending above said first mentioned and said second mentioned members together with members suitably connecting and extending between the inner walls of said wheel housings.

8. In a vehicle, the combination of a pair of wheel housings, a pair of frame members suitably connected with said wheel housings and extending transversely relative to the vehicle, a pair of frame members suitably supported and extending parallel with said first mentioned frame members, and resilient members suitably mounted in said wheel housings, said resilient members being operatively connected with said second mentioned pair of frame members.

9. In a vehicle comprising wheels, the combination of a frame structure comprising wheel housings extending over the wheels of said vehicle and suitably mounted resilient members having end portions extending through said wheel housings, the end portions of said resilient members being mounted above the upper side of said frame structure, said resilient members having their central portions located below the axis of the wheel assembly of the vehicle.

10. In a vehicle, the combination of a pair of wheel housings, having closed inner sides, frame members suitably connected with and extending adjacent the closed inner sides of said wheel housings, frame members suitably connected with and extending between said wheel housings, and frame members suitably connected with and extending suitably adjacent the front and rear ends of said wheel housings.

11. In a vehicle, the combination of a pair of wheel housings, resilient members extending through said wheel housings, a frame structure, said frame structure comprising a pair of cross members at each end of said wheel housings, brackets suitably mounted on one of each of said pairs of cross members, shackle members pivotally connecting the ends of said resilient members to said brackets on said cross members of said frame structure at points outside of said wheel housings, wheels in said wheel housings, and means operatively connecting said wheels with said wheel housings to control the direction of the movement of said resilient members and said wheels.

12. In a vehicle, the combination of a frame structure comprising wheel housings each having an open outer side together with a closed inner side, a pair of vertically aligned brackets suitably mounted on the closed inner side of each of said housings, a spindle member provided with a vertically extending portion extending through and engaging said pair of vertically aligned brackets, a wheel assembly rotatably mounted on each of said spindle members, and a resilient member suitably mounted on the underside of each of said spindle members between said wheel assemblies and the closed inner side of said housings, said resilient members being pivotally connected at each of its ends to said frame structure.

13. In a vehicle, the combination of a frame structure having a wheel housing provided with an open side together with an opening in its upper side, a pair of brackets mounted on the closed inner side of said wheel housing in alignment with each other and with the opening in the upper side of said wheel housing, a spindle member, a cylindrical member suitably connected to said spindle member at its upper side and engaging said pair of brackets, said cylindrical member extending through said brackets, the opening in the upper side of said wheel housing forming a clearance space for the extension of said cylindrical member therethrough when said frame structure is at one end of its movement, and a resilient member suitably connected at the under side of said spindle and in alignment with said cylindrical member, said resilient member being pivotally connected to said frame structure, said resilient member permitting vertical movement of said spindle member.

14. In a trailer vehicle, the combination of a frame structure comprising a front frame portion and a rear frame portion together with wheel housings suitably mounted therebetween and connected at their ends with said front and said rear frame portions, said wheel housings having open outer sides extending parallel with the sides of the frame structure, said frame structure comprising frame members extending for the complete distance between and connected with the sides of said wheel housings at points located in a vertical plane extending substantially through the centers of said wheel housings, wheel assemblies located within said wheel housings and operatively connected with the inner sides of said wheel housings, and resilient members suitably connected with said wheel assemblies and with said front and said rear portions of said frame structure at points beyond the ends of said wheel housings.

15. In a trailer vehicle, the combination of a frame structure provided with a pair of wheel housings having inner walls connected at their lower sides with frame members extending therebetween together with vertically extending members connected to the inner walls of said wheel housings, said vertically extending members being further connected at their lower ends with said frame members extending between said wheel housings, said vertically extending members being located closer together at their lower ends than at their upper ends, and wheel assemblies suitably mounted in said wheel housings and operatively connected with said frame structure, said frame structure forming the sole means for spacing said wheel assemblies.

16. In a trailer vehicle, the combination of a frame structure comprising a pair of wheel housings together with frame members connecting said wheel housings, said frame members being located approximately on the vertical center of said wheel housings, wheel assemblies located in each of said wheel housings, a pair of brackets mounted in each of said wheel housings, means for fastening said pair of brackets, said means engaging said frame members of said frame structure connecting said wheel assemblies, spindle members supporting each of said wheel assemblies and provided with members movably mounted in each of said pair of brackets, and resilient members connecting said spindle members and said frame structure.

17. In a trailer vehicle, the combination of spindle members each provided with a flange having a spring seat surface on its lower side together with U shaped depressions on its upper side for receiving clips, wheel assemblies rotatably mounted on each of said spindle members, a frame structure provided with wheel housings extending over said wheel assemblies, brackets mounted in said wheel housings, guide members mounted on said spindle members and engaging said brackets, springs seated on the seat surfaces of said spindle members, spring clips suitably mounted in the U shaped depressions of the flange of said spindle members and securing said springs against the seat surfaces of said spindle members, and means for pivotally connecting said springs with said frame structure.

18. In a trailer vehicle, the combination of a frame structure provided with semi-circular shaped wheel housings each having an open outer side together with a closed inner side, said wheel housings each being provided with an angle iron member extending across the outside of the bottom of its closed inner side and a semi-circular shaped angle member having a flange extending outwardly from and around the edge of the open outer side of said wheel housings, together with a semi-circular shaped angle member extending around the inside of said wheel housings adjacent the closed inner side of said wheel housings, wheel assemblies located in each of said wheel housings, and spindle members suitably mounted for supporting each of said wheel assemblies.

19. In a trailer vehicle, the combination of a pair of wheel assemblies, a frame assembly operatively connected with and extending adjacent the inner sides of said wheel assemblies, said frame assembly further extending adjacent the forward and rearward portions of said wheel assemblies, said frame assembly together with its mechanism operatively connected with said wheel assemblies, forming the sole means for spacing said wheel assemblies, a single spring operatively connected with each of said wheel assemblies, shackle members pivotally connecting the ends of each of said springs with the portions of said frame assembly extending adjacent the forward and rearward portions of said wheel assemblies, and means for guiding each of said wheel assemblies and its single spring to move in a vertical plane.

20. In a vehicle, the combination of a wheel spindle provided with a vertical extension portion located solely at the upper side of said wheel spindle, a frame structure, guide means supported by said frame structure and located wholly above said wheel spindle, said guide means slidably receiving said vertical extension portion of said wheel spindle, and resilient means operatively connected with said wheel spindle and said frame structure.

CHRISTIAN PETERSEN.